United States Patent
Sherman

(10) Patent No.: US 10,303,803 B2
(45) Date of Patent: *May 28, 2019

(54) SYSTEMS AND METHODS FOR MATCHING A USER TO SOCIAL DATA

(71) Applicant: eBay Inc., San Jose, CA (US)

(72) Inventor: Corinne Elizabeth Sherman, San Jose, CA (US)

(73) Assignee: eBay Inc., San Jose, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/401,200

(22) Filed: Jan. 9, 2017

(65) Prior Publication Data
US 2017/0116346 A1 Apr. 27, 2017

Related U.S. Application Data

(63) Continuation of application No. 14/155,032, filed on Jan. 14, 2014, now Pat. No. 9,542,692.

(51) Int. Cl.
*G06F 17/30* (2006.01)
*G06Q 30/02* (2012.01)
*G06Q 50/00* (2012.01)

(52) U.S. Cl.
CPC .... *G06F 17/30867* (2013.01); *G06F 17/3089* (2013.01); *G06Q 30/0241* (2013.01); *G06Q 50/01* (2013.01)

(58) Field of Classification Search
None
See application file for complete search history.

(56) References Cited

U.S. PATENT DOCUMENTS 8,694,577 B2 * 4/2014 D'Angelo ............. G06Q 10/10
705/1.1
9,191,422 B2 * 11/2015 Tarbox .................. H04L 65/604
(Continued)

FOREIGN PATENT DOCUMENTS

| CN | 102782685 | 11/2012 |
|---|---|---|
| CN | 106170814 A | 11/2016 |
| WO | WO-2015108698 A1 | 7/2015 |

OTHER PUBLICATIONS

"Korean Application Serial No. 10-2016-7021671, Office Action dated Apr. 18, 2017", W/ English Translation, 11 pgs.

(Continued)

*Primary Examiner* — Debbie M Le
(74) *Attorney, Agent, or Firm* — Schwegman Lundberg & Woessner, P.A.

(57) ABSTRACT

A system comprising a hardware storage device storing at least one program and a computer-implemented method for matching social data to a user of a networked-based content publisher are provided. Consistent with some embodiments, the method may access social network entries published on one or more social networks. Social network entries that include a reference to content published by a particular content publisher may be identified. A social network profile corresponding to a first social network entry of the identified social network entries may be identified. The method may further include determining that the social network profile corresponds to a particular user of the content publisher based on information embedded in the reference to the content.

19 Claims, 8 Drawing Sheets

(56) References Cited

U.S. PATENT DOCUMENTS

| | | | |
|---|---|---|---|
| 9,195,632 B2* | 11/2015 | Garcia-Martinez | G06F 17/30 |
| 9,406,071 B2* | 8/2016 | Liyanage | G06Q 50/01 |
| 9,479,289 B2* | 10/2016 | Park | H04L 1/0057 |
| 9,542,692 B2 | 1/2017 | Sherman | |
| 9,824,407 B2* | 11/2017 | Liyanage | G06Q 50/01 |
| 9,972,015 B2* | 5/2018 | Moore | G06Q 30/016 |
| 2010/0023506 A1* | 1/2010 | Sahni | G06F 17/30867 707/E17.014 |
| 2011/0258050 A1 | 10/2011 | Chan et al. | |
| 2011/0313996 A1 | 12/2011 | Strauss et al. | |
| 2013/0086057 A1 | 4/2013 | Harrington et al. | |
| 2013/0159885 A1 | 6/2013 | Yerli | |
| 2014/0067702 A1* | 3/2014 | Rathod | G06Q 10/10 705/319 |
| 2015/0066948 A1* | 3/2015 | Carlton | G06F 15/17306 707/748 |
| 2015/0120386 A1 | 4/2015 | Sherman et al. | |
| 2015/0186929 A1* | 7/2015 | Thies | G06Q 30/0246 705/14.45 |
| 2015/0199437 A1 | 7/2015 | Sherman | |

OTHER PUBLICATIONS

"Korean Application Serial No. 10-2016-7021671, Response filed Jul. 18, 2017 toOffice Action dated Apr. 18, 2017", W / English Claims, 22 pgs.

Final Office Action Received for Korean Patent Application No. 10-2016-7021671 dated Mar. 2, 2018, 7 pages (3 pages of English translation and 4 pages of Official copy).

Office Action received for Korean Patent Application No. 10-2016-7021671, dated Nov. 30, 2017, 7 pages.

Response to Office Action filed on Jan. 30, 2018, for Korean Patent Application No. 10-2016-7021671, dated Nov. 30, 2017, 27 pages.

"U.S. Appl. No. 14/155,032, Non Final Office Action dated Mar. 10, 2016", 8 pgs.

"U.S. Appl. No. 14/155,032, Notice of Allowance dated Sep. 6, 2016", 8 pgs.

"U.S. Appl. No. 14/155,032, Response Filed Jun. 10, 2016 to Non Final Office Action dated Mar. 10, 2016", 11 pgs.

"International Application Serial No. PCT/US2014/072690, International Preliminary Report on Patentability dated Jul. 28, 2016", 6 pgs.

"International Application Serial No. PCT/US2014/072690, International Search Report dated Mar. 19, 2015", 2 pgs.

"International Application Serial No. PCT/US2014/072690, Written Opinion dated Mar. 19, 2015", 4 pgs.

"Korean Application Serial No. 10-2018-7012732, Notice of Preliminary Rejection dated Aug. 2, 2018", (w English Translation), 12 pages.

"Korean Application Serial No. 10-2018-7012732, Response filed Oct. 2, 2018 to Notice of Preliminary Rejection dated Ayg. 2, 2018", (w English Claims), 33 pages.

"Chinese Application Serial No. 201480076555.2, Office Action dated Jan. 9, 2019", (w English Translation), 36 pages.

* cited by examiner

SYSTEMS AND METHODS FOR MATCHING A USER TO SOCIAL DATA

CROSS-REFERENCE TO RELATED APPLICATION

This application is a continuation of and claims the benefit of priority to U.S. patent application Ser. No. 14/155,032, filed Jan. 14, 2014, entitled "SYSTEM AND METHOD FOR MATCHING A USER TO SOCIAL DATA," which is hereby incorporated by reference herein in its entirety.

TECHNICAL FIELD

This application relates to data processing. In particular, example embodiments may relate to systems and methods for matching social data to a user of a network-based content publisher.

BACKGROUND

Websites often provide a social sharing feature in the form of a share widget for content hosted by the website. These share widgets enable users to quickly share content with members of their social network using multiple social network services (e.g., Facebook®, Twitter®, Pinterest®, or the like). Although such functionality may provide users with a link between the website's services and the social network services, the websites themselves are often unable to ascertain which of their users correspond to the social network profiles used to publish content from the websites.

BRIEF DESCRIPTION OF THE DRAWINGS

Various ones of the appended drawings merely illustrate example embodiments of the present invention and cannot be considered as limiting its scope.

DETAILED DESCRIPTION

Reference will now be made in detail to specific example embodiments for carrying out the inventive subject matter. Examples of these specific embodiments are illustrated in the accompanying drawings. It will be understood that the examples are not intended to limit the scope of the claims to the described embodiments. On the contrary, the examples are intended to cover alternatives, modifications, and equivalents as may be included within the scope of the disclosure. In the following description, specific details are set forth in order to provide a thorough understanding of the subject matter. Embodiments may be practiced without some or all of these specific details. In accordance with the present disclosure, components, process steps, and data structures may be implemented using various types of operating systems, programming languages, computing platforms, computer programs, and/or general purpose machines.

Aspects of the present disclosure include systems and methods for matching social data to users of a network-based content publisher. Consistent with some embodiments, the method may include scanning social network entries (e.g., posts, status updates, tweets, pins, etc.) to identify social network entries that include a uniform resource locator (URL) referencing content hosted by the network-based content publisher. A social network profile corresponding to each entry (e.g., an author or original poster) may be identified. The method may further include matching the identified social network profiles to users of the network-based content publisher based on information included in the URL shared in each social network entry. The network-based content publisher may then provide each matched user with personalization services personalized recommendations or search results) using information retrieved from each user's corresponding social network profile.

Figure 1:
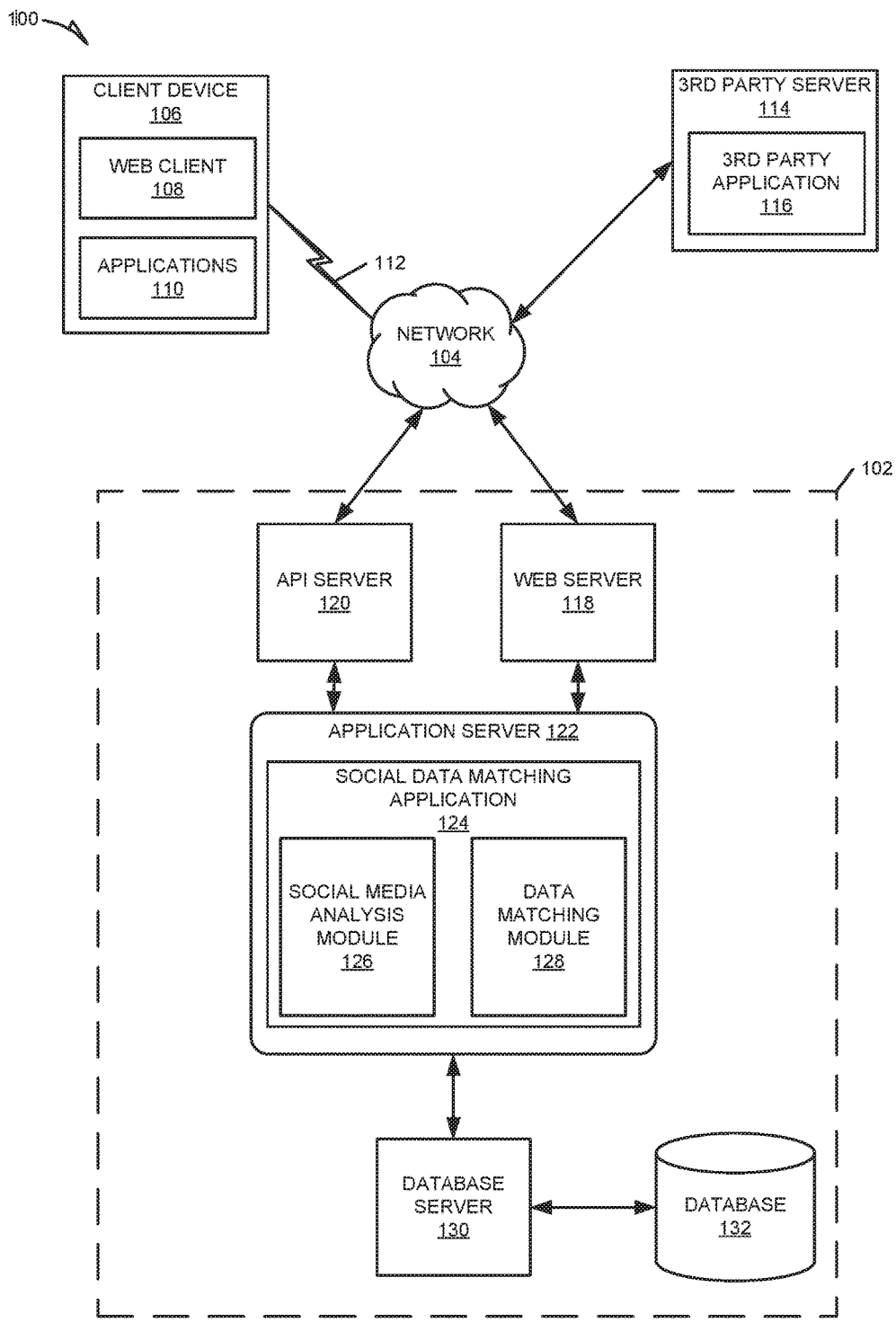
FIG. 1 is a network diagram depicting a network system having a client-server architecture configured for exchanging data over a network with a content publisher, according to an example embodiment.

FIG. 1 is a network diagram depicting a network system 100, according to one embodiment, having a client-server architecture configured for exchanging data over a network. The network system 100 may include a network-based content publisher 102 in communication with a client device 106 and third party server 114. In some example embodiments, the network-based content publisher 102 may be a network-based marketplace.

The network-based content publisher 102 may communicate and exchange data within the network system 100 that may pertain to various functions and aspects associated with the network system 100 and its users. The network-based content publisher 102 may provide server-side functionality, via a network 104 (e.g., the Internet), to one or more client devices (e.g., client device 106). The one or more client devices may be operated by users that use the network system 100 to exchange data over a network 104. These transactions may include transmitting, receiving (communicating), and processing data to, from, and regarding content and users of the network system 100. The data may include, but are not limited to: images; video or audio content; user preferences; product and service feedback, advice, and reviews; product, service, manufacturer, and vendor recommendations and identifiers; product and service listings associated with buyers and sellers; product and service advertisements; auction bids; transaction data; and social data, among other things.

In various embodiments, the data exchanged within the network system 100 may be dependent upon user-selected functions available through one or more client or user interfaces (UIs). The UIs may be associated with a client device, such as the client device 106 using web client 108. The web client 108 may be in communication with the network-based content publisher 102 via a web server 118. The UIs may also be associated with one or more applications 110 executing on the client device 106, such as a client application designed for interacting with the network-based content publisher 102, or a third party server 114 (e.g., one or more servers or client devices) hosting a third party application 116.

The client device 106 may be any of a variety of types of devices. For example, the client device 106 may a mobile device such as an iPhone® or other mobile device running the iOS® operating system, the Android® operating system, a BlackBerry® operating system, the Microsoft® Windows® Phone operating system, Symbian® OS, or webOS®. Consistent with some embodiments, the client device 106 may alternatively be a tablet computer, such as an iPad® or other tablet computer, running one of the aforementioned operating systems. In some embodiments, the client device 106 may also be a personal digital assistant (PDA), a personal navigation device (PND), a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, or a video game system console such as the Nintendo Wii®, the Microsoft Xbox 360®, the Sony PlayStation 3®, or other video game system consoles.

The client device 106 may interface via a connection 112 with the communication network 104 (e.g., the Internet or wide area network (WAN)). Depending on the form of the client device 106, any of a variety of types of connections 112 and communication networks 104 may be used. For example, the connection 112 may be a Code Division Multiple Access (CDMA) connection, a Global System for Mobile communications (GSM) connection, or other type of cellular connection. Such a connection 112 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 104 may include a cellular network that has a plurality of cell sites of overlapping geographic coverage interconnected by cellular telephone exchanges. These cellular telephone exchanges may be coupled to a network backbone (e.g., the public switched telephone network (PSTN), a packet-switched data network, or other types of networks).

In another example, the connection 112 may be Wireless Fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a WAN, the Internet, or other packet-switched data network. In yet another example, the connection 112 may be a wired connection, for example an Ethernet link, and the communication network 104 may be a LAN, a WAN, the Internet, or other packet-switched data network. Accordingly, a variety of different configurations are expressly contemplated.

FIG. 1 also illustrates the third party application 116 executing on the third party server 114 that may offer one or more services to users of the client device 106. The third party application 116 may have programmatic access to the network-based content publisher 102 via the programmatic interface provided by an application program interface (API) server 120. In some embodiments, the third party application 116 may be associated with any organization that may conduct transactions with or provide services to the users of the client device 106. For example, the third party application 116 may be associated with a network based social network service (e.g., Facebook®, Twitter®, Google +®, Pinterest®, LinkedIn®, or the like) that may provide a platform for members to build and maintain social networks and relations among other members. To this end, the social network service may allow members to share ideas, pictures, posts, activities, events, and interests with other members of the social network.

A social network service may provide a representation of each member in the form of a social network profile. The social network profile of each member may contain information about the member (hereinafter referred to as "social data") such as demographic information (e.g., gender, age, etc.), geographic information (e.g., a user's hometown, a user's current location, etc.), interests, and social network connections of the members. For purposes of the present disclosure, a social network "connection," also referred to as being "connected" on a social network, may include situations in which there is a reciprocal agreement between members of the social network to be linked on the social network, as well as situations in which there is only a singular acknowledgement of the "connection" without further action being taken by the other member. In the reciprocal agreement situation, both members of the "connection" acknowledge the establishment of the connection e.g., friends). Similarly, in the singular acknowledgement situation, a member may elect to "follow" or "watch" another member. In contrast to reciprocal agreement, the concept of "following" another member typically is a unilateral operation because it may not call for acknowledgement or approval by the member that is being followed.

Turning specifically to the network-based content publisher 102, the API server 120 and the web server 118 are coupled to, and provide programmatic and web interfaces respectively to, one or more application servers 122. The application server 122 may, for example, host one or more applications, which may provide a number of content publishing and viewing functions and services to users that access the network-based content publisher 102. The application server 122 may further host a plurality of user accounts for users of the network-based content publisher 102, which may be stored in the database 132. Users of the network-based content publisher 102 without a user account may be assigned a globally unique identifier (GUID) so that such users may, nonetheless, be uniquely identified by the network-based content publisher 102.

As illustrated in FIG. 1, the application server 122 may host a social data matching applications 124, which may match social data from one or more social networks with a plurality of users of the network-based content publisher 102. The social data matching applications 124 may include asocial media analysis module 126 and a data matching module 128. The modules of the social data matching application 124 may be hosted on dedicated or shared server machines that are communicatively coupled to enable communications between server machines. The social media analysis module 126 and the data matching module 128 are communicatively coupled (e.g., via appropriate interfaces) to each other and to various data sources, so as to allow information to be passed between each of the modules 126 and 128 or so as to allow the modules 126 and 128 to share and access common data.

The social media analysis modules 126 may be configured to monitor, retrieve, and analyze social network activity published on one or more social networks. For purposes of the present disclosure, "social network activity" collectively refers to entries (e.g., text and image posts, links, messages, notes, invitations, etc.) created and shared by members of a social network with other members of the social network. Such social network activity may include entries that are intended for the public at large as well as entries intended for a particular social network connection or group of social network connections. Depending on the social network, the social network activity may include entries such as an activity feed post, a wall post, a status update, a tweet, a pinup, a like, a content share e.g., content shared from a source such as the network-based content publisher 102), or a check-in. For purposes of the present disclosure, a "check-in" refers to a service provided by a social network that allows users to "check-in" to a physical or virtual space and share their location or activity with other users of the social network. Check-ins may be active (e.g., a user may actively check-in at a location) or passive (the social network service may detect that a user is at a location and automatically check the user in). Consistent with some embodiments, users may actively check-in to a specific physical or virtual location by using a mobile application provided by the social network on a client device (e.g., client device 106). The social network mobile application may use the GPS functionality of the client device to find the current location of the user and allow the user to share this information with other users of the social network.

The social media analysis module 126 may obtain social network activity via publically accessible APIs provided by each social network service. In some embodiments, the social media analysis modules 126 may be configured to scan one or more social networks to identify social network entries that include content originating from the network-based content publisher 102. In particular, the social media analysis modules 126 may identify social network entries that include a URL referencing content (e.g., a web page) hosted by the network-based content publisher 102. For each such social network entry, the social media analysis module 126 may identify a social network profile from which the entry originated (e.g., an author or original poster). The social media analysis module 126 may further identify a timestamp corresponding to a time at which the social network entry was posted (hereinafter referred to as "posting time").

The data matching module 128 may be configured to match the social network profile of each social network entry identified by the social media analysis module 126 as including content from the network-based content publisher 102 with a user of the network-based content publisher 102. The users of the network based content publisher 102 may include users having a user account provided by the network-based content publisher 102 as well as users without a user account (e.g., users identified solely by a corresponding GUID). The data matching module 128 may retrieve social data from the social network profile determined to correspond to the user, and the data matching module 128 may further associate such social data with the user (e.g., the social data may be stored as part of the user account or stored as a record linked to a corresponding GUID). The retrieved social data may be used by the network based content publisher 102 to provide personalized services to the user such as personalized search results, recommendations, and advertising.

As illustrated in FIG. 1, the application servers 122 may be coupled via the API server 120 and the web server 118 to the communication network 104, for example, via wired or wireless interfaces. The application servers 122 are, in turn, shown to be coupled to a database server 130 that facilitates access to the database 132. In some examples, the application servers 122 can access the database 132 directly without the need for a database server 130. In some embodiments, the database 132 may include multiple databases that may be internal or external to the network-based content publisher 102.

The database 132 may store data pertaining to various functions and aspects associated with the network system 100 and its users. For example, user accounts for users of the network based content publisher 102 may be stored and maintained in the database 132. Each user account may comprise user data that describes aspects of a particular user. The user data may include demographic data, user preferences, and financial information. The demographic data may, for example, include information describing one or more characteristics of a user. Demographic data may, for example, include gender, age, location information, employment history, education history, contact information, familial relations, or user interests. The financial information may, for example, include private financial information of the user such as account number, credential, password, device identifier, user name, phone number, credit card information, bank information, transaction history, or other financial information that may be used to facilitate online transactions by the user. Consistent with some embodiments, the transaction history may include information related to transactions for items or services (collectively referred to as "products") that may be offered for sale by merchants using marketplace services provided by the network based content publisher 102. The transaction history information may, for example, include a description of a product purchased by the user, an identifier of the product, a category to which the product belongs, a purchase price, a quantity, or a number of bids.

The user data may also include a record of user activity, consistent with some embodiments. Accordingly, the network-based content publisher 102 may monitor, track, and record the activities and interactions of a user, using one or more devices (e.g., client device 106), with the various modules of the network system 100. Each user session may be stored in the database 132 as part of an activity log, and each user session may also be maintained as part of the user data. Accordingly, in some embodiments, the user data may include past keyword searches that users have performed, web pages viewed by each user, products added to a user wish list or watch list, products added to an electronic shopping cart, and products that the users own. User preferences may be inferred from the user activity.

Consistent with some embodiments, the database 132 may further include an access log that may include a record of accesses to particular resources (e.g., a web page or other content) of the network-based content publisher 102. The access log may include an access time for each respective access of a resource and may further include a record of the user that accessed each resource at each respective access time. Users may be identified by a corresponding user account or by other unique numerical identifiers (e.g., a GUID).

While the social data matching application 124 is shown in FIG. 1 to form part of the network-based content publisher 102, it will be appreciated that, in alternative embodiments, the social data matching application 124 may form part of a service that is separate and distinct from the network-based content publisher 102. Further, while the system 100 shown in FIG. 1 employs client-server architecture, the present inventive subject matter is, of course, not limited to such an architecture, and could equally well find application in an event-driven, distributed, or peer-to-peer architecture system, for example. The various functional components of the application servers 122 may also be implemented as standalone systems or software programs, which do not necessarily have networking capabilities. It shall be appreciated that although the various functional components of the system 100 are discussed in the singular sense, multiple instances of one of more of the various functional components may be employed.

Figure 2:
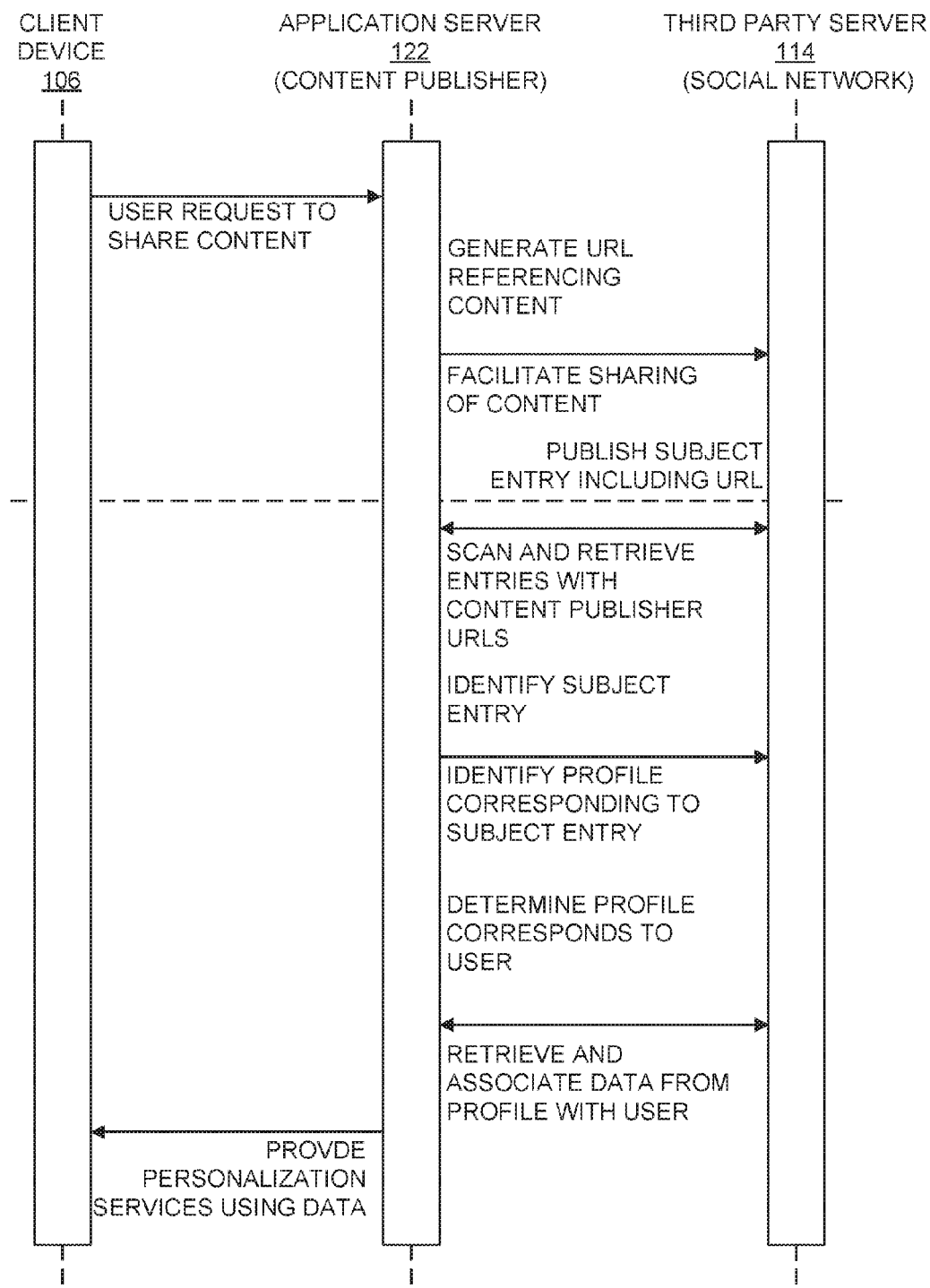
FIG. 2 is an interaction diagram depicting example exchanges between a client device, an application server, and a third party server, consistent with some embodiments.
Figure 3A:
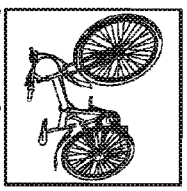
FIG. 3A is an interface diagram illustrating a portion of a web page hosted by the content publisher, consistent with some embodiments.

FIG. 2 is an interaction diagram depicting example exchanges between a client device, an application server, and a third party server, consistent with some embodiments. In particular, FIG. 2 depicts example exchanges between the client device 106, the application server 122 of the network-based content publisher 102, and the third party server 114 corresponding to a social network service. As shown, the application server 122 may receive a user request to share content from the client device 106. The request may be generated in response to a user selection of a particular social network icon provided as part of a share widget embedded in a web page hosted by the network based content publisher. For example, FIG. 3A is an interface diagram illustrating a portion of a web page 300 hosted by the network-based content publisher 102, consistent with some embodiments. As shown, the web page 300 includes content related to a marketplace listing. In addition, the web page 300 includes a share widget 302 comprising icons 304-310, each of which corresponds to a particular social network service (e.g., Google +®, Facebook®, Twitter®, and Pinterest®). The share widget 302 may be used by a user of the network-based content publisher 102 to share the web page 300 with members of a social network. The particular social network service to be utilized in sliming the web page 300 depends on the selection of the icons 304-310. Selection of one of the icons 304-310 results in the generation of the user request to share content, which is transmitted to the application server 122.

Returning back to FIG. 2, upon receipt of the user request, the application server 122 may generate a URL referencing the location of the web page 300. In addition to referencing the location of the web page 300, the URL generated by the application server 122 may include additional information such as an identifier of a user operating the client device 106. As discussed above, the network-based content publisher 102 may provide services to users that have a user account as well as users that do not. Upon initiating an interaction with the network-based content publisher 102, users may be prompted to log in to an existing user accounts. In instances in which the user operating the client device 106 has signed in prior to requesting to share the web page 300, the application server 122 may generate a specialized URL (e.g., a "roverized" or "universal" URL) that includes an identifier of the user account of the user. In some embodiments, the URL may include an identifier of an item (e.g., product or service) offered for sale in a listing hosted by the network-based content publisher 102.

In instances in which the user operating the client device 106 has not signed in or does not have a user account with the network-based content publisher 102, the URL generated by the application server 122 may include a reference to the GUID identifying the user that may have been previously assigned to the user during a previous data exchange session. A record of each generated URL may be maintained in an activity log stored in the database 132 and may include a time at which the URL was generated. Each record may be linked to a user account or GUID corresponding to the user requesting the sharing of the content.

As shown in FIG. 2, the application server 122 may, subsequent to the generation of the URL, facilitate the sharing of the content (e.g., the web page 300). The facilitating of the sharing of the content may include automatically generating at least a portion of a social network entry that includes the URL (referred to as the "subject entry"). The application server 122 may then communicate with the social network service hosted by the third party server 114 to provide an interface to the user of the client device 106, which enables the user to sign in to asocial network profile provided by the social network service. The user may be able to edit the subject entry or provide additional comments before the subject entry is ultimately published by the social network service. Once the user indicates approval of the subject entry, the subject entry is published by the social network service.

Figure 3B:
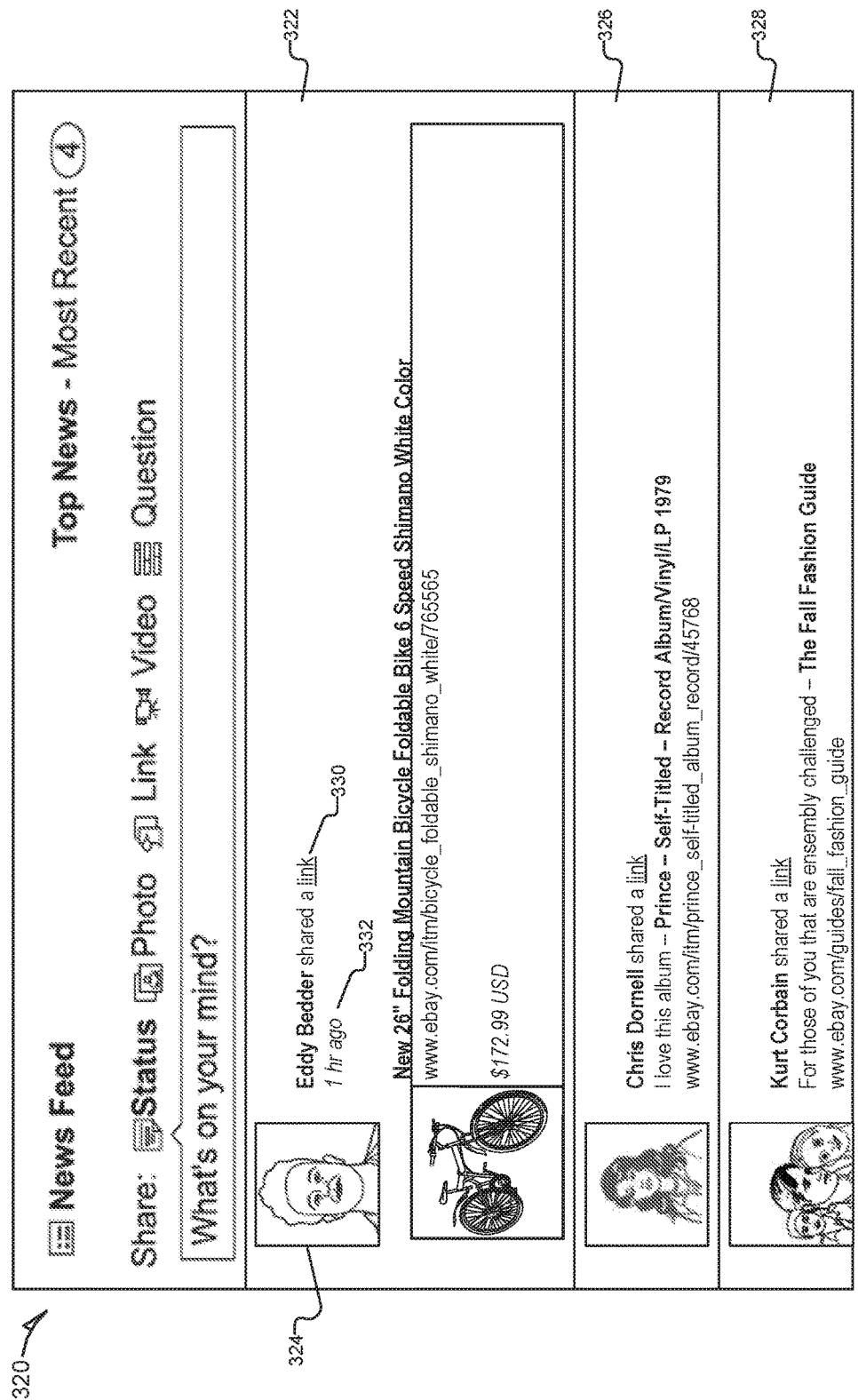
FIG. 3B is an interface diagram illustrating a set of social network entries published on a social network, which may be hosted by the third party server of FIG. 2, consistent with some embodiments.

As shown in FIG. 2, the application server 122 may scan social network entries on the social network service and retrieve entries with URLs referencing content (e.g., web pages) of the network based content publisher 102. Such operations may be performed routinely by the application server 122 and not necessarily in connection with the publishing of the subject entry discussed above. An example of social network entries retrieved by the application server are illustrated in FIG. 3B. As shown in FIG. 2, the application server 122 may identify the subject entry from the retrieved social network entries.

FIG. 3B is an interface diagram illustrating a set of social network entries 300 published on the social network, which may be hosted by the third party server 114, consistent with some embodiments. As shown, the set of social network entries 300 may include subject entry 322 published on behalf of a social network profile 324 as well as social network entries 326 and 328 corresponding to various other social network profiles. The subject entry 322 may include a link 330 referencing the location of the web page 300 (e.g., the URL generated by the application server 122 in response to the user request to share the web page 300). Consistent with some embodiments, the subject entry 322 may include multiple instances of the link 330. The link 330, when activated, may cause a browser executing on the client device 106 to be redirected to the web page 300. As illustrated in FIG. 3B, the subject entry 322 may also include a timestamp 332, which indicates the posting time of the subject entry 322.

Returning again to FIG. 2, the application server 122 may identify the social network profile 324 as the social network profile corresponding to the subject entry 322. The application server 122 may then determine that the social network profile 324 corresponds to the user for which the URL included in the subject entry 322 was generated. In some embodiments, this determination is based on information contained in the URL (e.g., an identifier of user account of the user). In some other embodiments, the determination may be based on a comparison of the timestamp 332 with the access time of the web page 300 by the user. In still other embodiments, the determination may be based on a comparison of the timestamp 322 with the generation time of the URL.

Upon determining that the social network profile 322 corresponds to the user, the application server may retrieve social data included as part of the social network profile 322 and associate such social data with the user. The associating of the social data may comprise linking the social data to a record of the user (e.g., the user account or a GUID identifying the user). The application server 122 may then use the retrieved social data to provide personalized services (e.g., search results, recommendations, etc.) to the user upon subsequent interactions with the client device 106 or other devices operated by the user.

Figure 4:
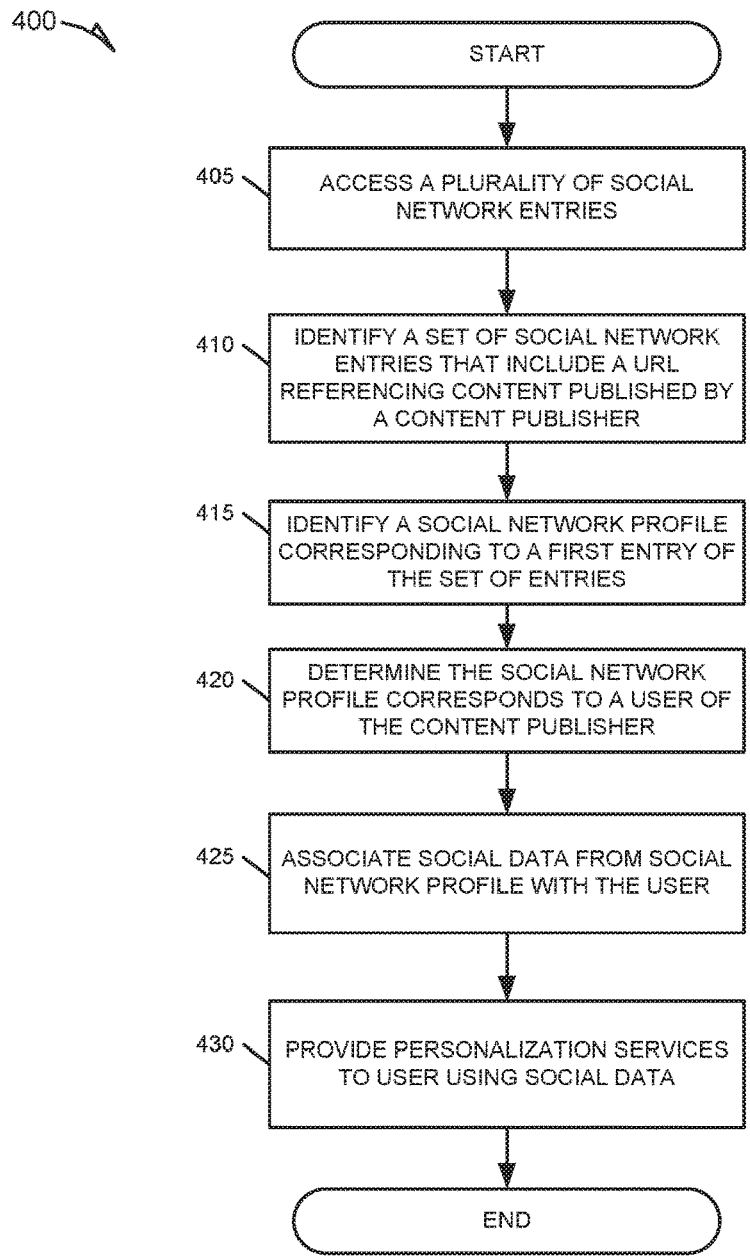
FIG. 4 is a flowchart illustrating a method for matching a user of the content publisher with social data, consistent with some embodiments.

FIG. 4 is a flowchart illustrating a method 400 for matching a user of the content publisher with social data, consistent with some embodiments. The method 400 may be embodied in computer-readable instructions for execution by one or more processors such that the steps of the method 400 may be performed in part or in whole by the application server 122, and in particular, the modules comprising the social data matching application 124.

At operation 405, the social media analysis module 126 may access a plurality of social network entries that have been published to one or more social networks using one or more social network services (e.g., hosted by third party server 114). In some embodiments, the social media analysis module 126 may obtain the plurality of social network entries directly from the social network services via a plurality accessible API provided by the one or more social network services. In some other embodiments, the social media analysis module 126 may retrieve the plurality of social network entries from a repository of previously retrieved social network entries (e.g., database 132). The social network entries may be periodically (e.g., daily) retrieved and stored (e.g., in database 132) for subsequent analysis by the social media analysis module 126.

At operation 410, the social media analysis module 126 may identify a set of social network entries from the plurality of social network entries that each include a URL referencing content published by the network-based content publisher 102. In some embodiments, the identifying of the set of social network entries including a URL referencing content published by the network-based content publisher 102 may comprise analyzing text included in the social network entries to identify URLs having a host (e.g., domain name or literal internet protocol (IP) address) corresponding to the network-based content publisher 102 (e.g., all URLs from ebay.com). In some embodiments, the social media analysis module 126 may invoke functionality of a third party service to identify the set of social network entries including a URL referencing content published by the network-based content publisher 102.

At operation 415, the social media analysis module 126 may identify a social network profile corresponding to a first social network entry (e.g., social network entry 322) of the set of social network entries. The social network profile corresponding to the first social network entry may be the social network profile of a member who initiated the publishing of the first social network entry (e.g., an author). In some embodiments, the social media analysis module 126 may analyze the first social network to determine that the identified social network profile is the original poster of the content. More specifically, the social media analysis module 126 may ensure that the first social network entry is not a re-post of content posted by another user.

At operation 420, the data matching module 128 may determine that the social network profile identified in operation 415 corresponds to a particular user of the network-based content publisher 102. In some embodiments, the determination that the social network profile corresponds to the particular user may be based on information embedded in the URL included in the first social network entry. For example, the URL may include an identifier of a user account of the particular user (e.g., an account number or other numerical identifier) or identifier of the user (e.g., a GUID). Further details of the operation 420 are discussed in FIGS. 5 and 6, consistent with various embodiments.

At operation 425, the data matching module 128 may associate social data, maintained as part of the social network profile, with the particular user. The social data may, for example, include demographic information (e.g., gender, age, etc.), geographic information (e.g., a user's hometown, a user's current location, etc.), interests, and social network connections of the members. The associating of the social data with the particular user may comprise storing a record of the social data in conjunction with a record of the user. For example, the social data may be stored and maintained as part of the user account of the particular user. In other examples, the social data may be stored in conjunction with the pertinent GUID of the particular user.

At operation 430 the network-based content publisher 102 may use the social data to provide personalization services to the user. The personalization services may, for example, include providing personalized search results, recommendations, or advertising.

Figure 5:
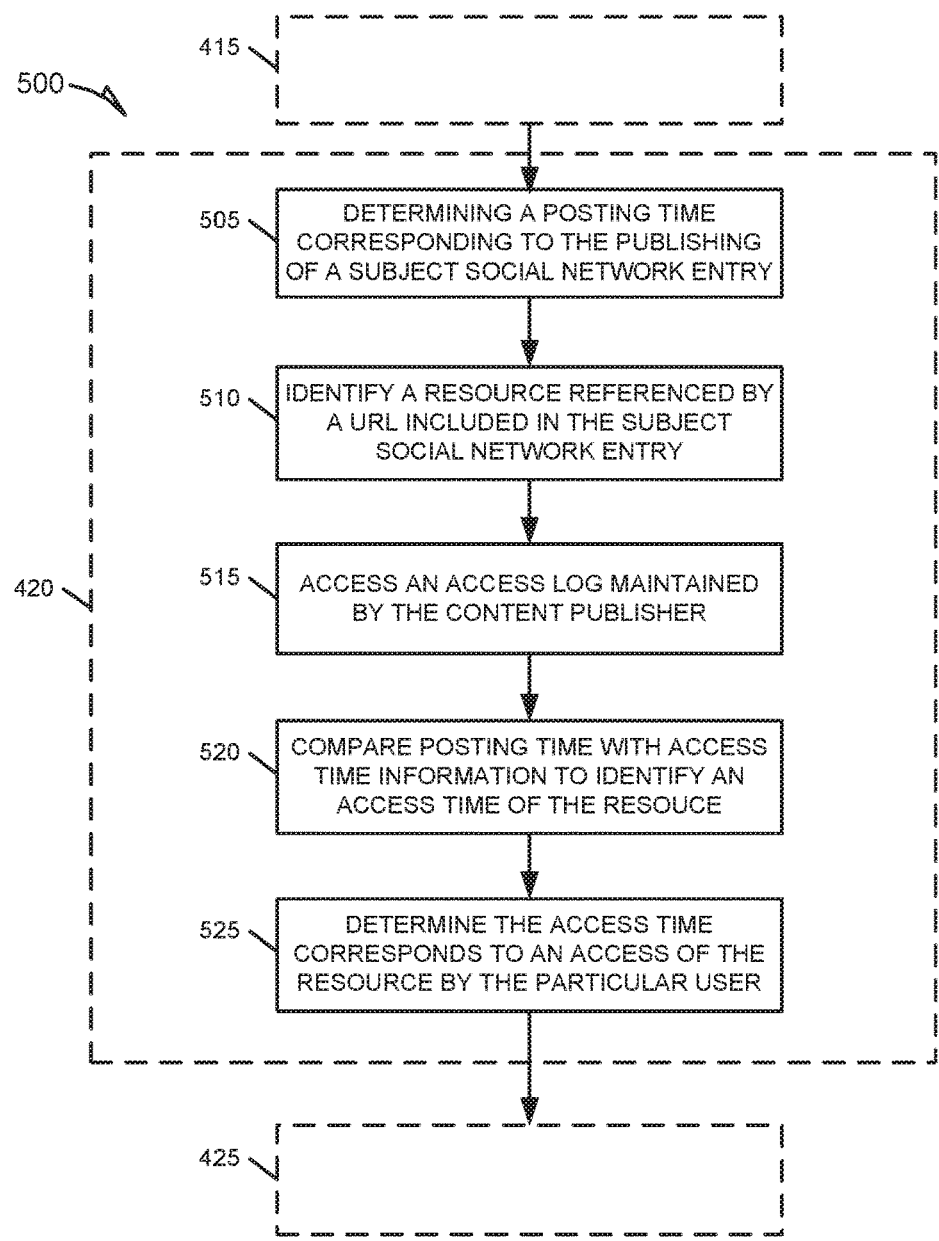
FIG. 5 is a flowchart illustrating a method for determining that a social network profile that corresponds to a user of the content publisher, consistent with some embodiments.

FIG. 5 is a flowchart illustrating a method 500 for determining that a social network profile corresponds to a user of the content publisher, consistent with some embodiments. The method 500 may correspond to various steps comprising the operation 420 from method 400, consistent with some embodiments. The method 500 may be embodied in computer-readable instructions for execution by one or more processors such that the steps of the method 500 may be performed in part or in whole by the application server 122, and in particular, the modules comprising the social data matching application 124.

At operation 505, the data matching module 128 may determine a posting time corresponding to the publishing of the subject social network entry (e.g., the first social network entry of the set of social network entries identified at operation 415). The determining of the posting time of the subject social network entry may comprise accessing a timestamp (e.g., timestamp 332) corresponding to the publishing of the subject social network entry. Such a timestamp may be obtained from the social network service from which the subject social network entry was retrieved.

At operation 510, the data matching module 128 may identify a resource (e.g., content published by the network-based content publisher 102) referenced by the URL included in the subject social network entry. For example, the data matching module 128 may identify a specific web page referenced by the URL. At operation 515, the data matching module 128 may access an access log maintained by the network-based content publisher 102. The access log may include an entry for each web page or other resource hosted by the network-based content publisher 102, and may further include a record of each time a particular web page or other resource was accessed. The access log may further include an identifier (e.g., a GUID) of the user who accessed the particular web page or other resource at a particular time.

At operation 520 the data matching module 128 may compare the posting time of the subject social network entry with the access time information of the referenced resource from the access log to identify an access of the resource that is within a predetermined time range of the posting time of the social network entry. For example, the data matching module 128 may identify an access of the reference occurring one minute prior to the posting time of the subject social network entry. Consistent with some embodiments, the predetermined time range may correspond to an average amount of time taken to share a resource hosted by the network-based content publisher 102 with the one or more social networks. At operation 525, the data matching module 128 may determine the access time identified in operation 520 corresponds to an access of the resource by the particular user. The determination that the particular user corresponds to the access may be based on the access information maintained as part of the access log of the network-based content publisher 102.

Figure 6:
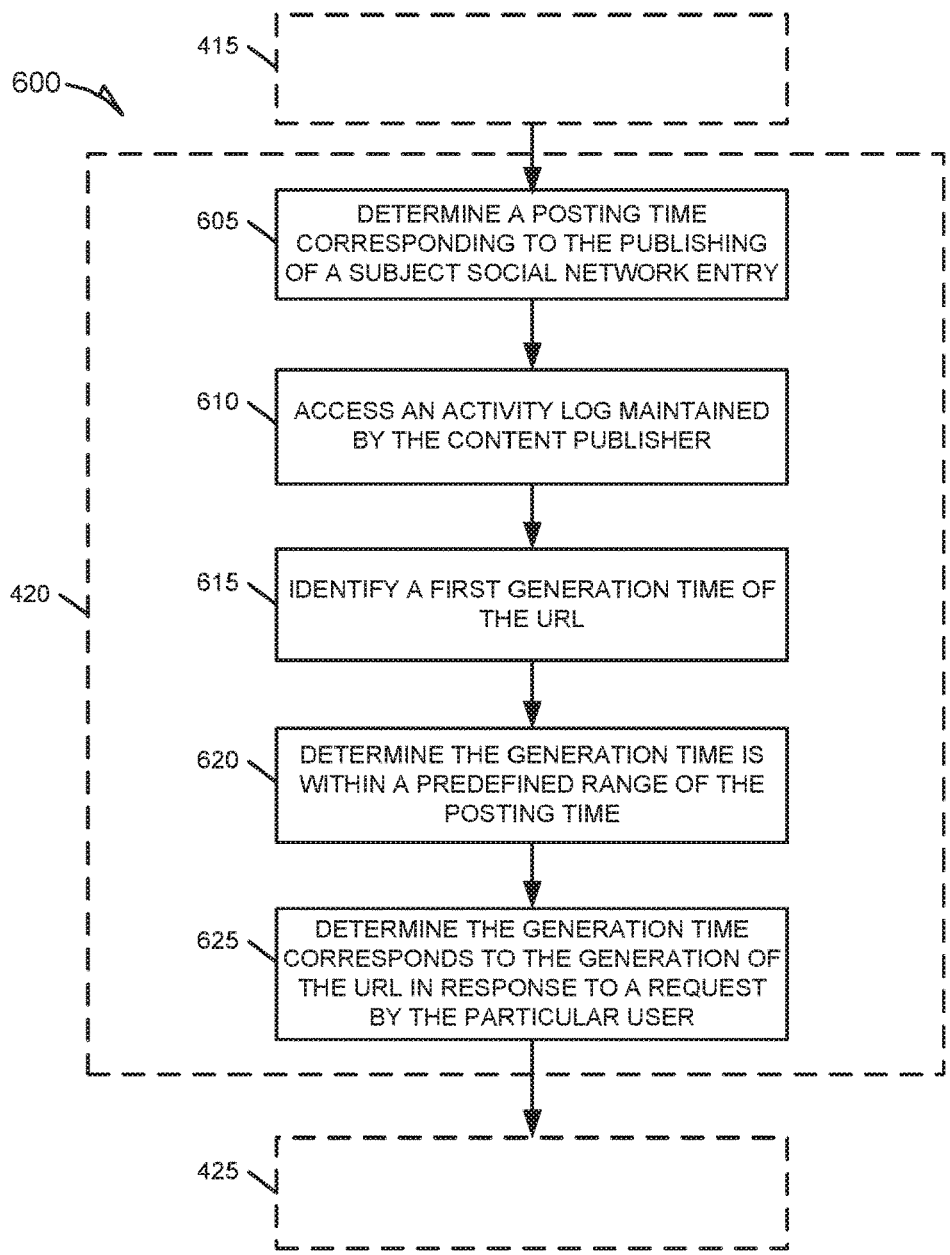
FIG. 6 is a flowchart illustrating another method for determining that a social network profile that corresponds to a user of the content publisher, consistent with some other embodiments.

FIG. 6 is a flowchart illustrating a method 600 for determining a social network profile corresponds to a user of the content publisher, consistent with some other embodiments. The method 600 may correspond to various steps comprising the operation 420 from method 400, consistent with some embodiments. The method 600 may be embodied in computer-readable instructions for execution by one or more processors such that the steps of the method 600 may be performed in part or in whole by the application server 122, and, in particular, the modules comprising the social data matching application 124.

At operation 605, the data matching module 128 may determine a posting time corresponding to the publishing of the subject social network entry (e.g., the first social network entry of the set of social network entries identified at operation 415). The determining of the posting time of the subject social network entry may comprise accessing a timestamp (e.g., timestamp 332) corresponding to the publishing of the subject social network entry. Such a timestamp may be obtained from the social network service from which the subject social network entry was retrieved.

At operation 610, the data matching module 128 may access an activity log maintained by the network-based content publisher 102. The activity log may include an entry for each URL generated by the network-based content publisher 102 in response to a request to share a web page (e.g., via selection of the share widget 302), or other resource hosted by the network-based content publisher 102, and may further include a record of each time a particular UAL was generated. The access log may further include an identifier (e.g., a GUID) of the user who requested the generation of the UAL.

At operation 615, the data matching module 128 may identify a generation time of the URL included in the subject social network entry. At operation 620, the data matching module 128 may determine that the generation time is within a predetermined time range of the posting time of the social network entry. For example, the data matching module 128 may determine that the generation time of the URL occurred 30 seconds prior to the posting time of the subject social network entry. Consistent with some embodiments, the predetermined time range may correspond to the average amount of time taken to share a generated URL with the one or more social networks. At operation 625, the data matching module 128 may determine the generation time identified in operation 615 corresponds to the generation of the URL in response to a request submitted by the particular user. Such a determination may be based on the information maintained as part of the activity log of the network-based content publisher 102.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors may be configured by software (e.g., an application or application portion as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a FPGA or an ASIC) to perform certain operations. A hardware module may also comprise programmable logic or circuitry e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
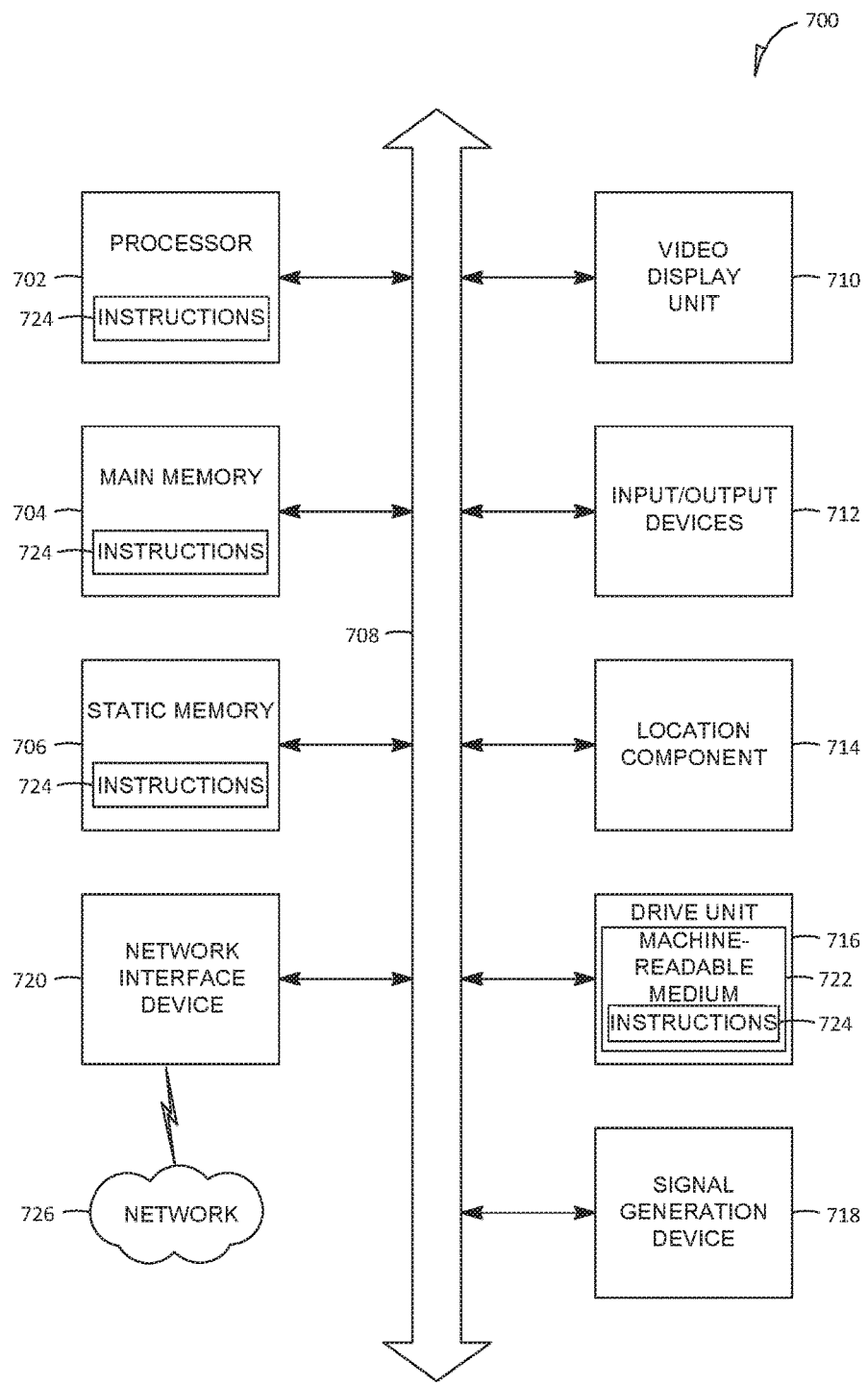
FIG. 7 is a diagrammatic representation of a machine in the example form of a computer system within which a set of instructions for causing the machine to perform any one or more of the methodologies discussed herein may be executed.

FIG. 7 is a diagrammatic representation of a machine in the example form of a computer system 700 within which a set of instructions for causing the machine to perform any one or more of the methodologies discussed herein may be executed. The computer system 700 may correspond to client device 106, third party server 114, or application server 122, consistent with some embodiments. The computer system 700 may include instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a STB, a PDA, a cellular telephone, a smart phone (e.g., iPhone®), a tablet computer, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes one or more input/output (I/O) devices 712, a location component 714, a drive unit 716, a signal generation device 718 (e.g., a speaker), and a network interface device 720. The I/O devices 712 may, for example, include a keyboard, a mouse, a keypad, a multi-touch surface (e.g., a touchscreen or track pad), a microphone, a camera, and the like.

The location component 714 may be used for determining a location of the computer system 700. In some embodiments, the location component 714 may correspond to a UPS transceiver that may make use of the network interface device 720 to communicate GPS signals with a GPS satellite. The location component 714 may also be configured to determine a location of the computer system 700 by using an IP address lookup or by triangulating a position based on nearby mobile communications towers. The location component 714 may be further configured to store a user-defined location in main memory 704 or static memory 706. In some embodiments, a mobile location enabled application may work in conjunction with the location component 714 and the network interface device 720 to transmit the location of the computer system 700 to an application server or third party server for the purpose of identifying the location of a user operating the computer system 700.

In some embodiments, the network interface device 720 may correspond to a transceiver and antenna. The transceiver may be configured to both transmit and receive cellular network signals, wireless data signals, or other types of signals via the antenna, depending on the nature of the computer system 700.

Machine-Readable Medium

The drive unit 716 includes a machine-readable medium 722 on which is stored one or more sets of data structures and instructions 724 (e.g., software) embodying or used by any one or more of the methodologies or functions described herein. The instructions 724 may also reside, completely or at least partially, within the main memory 704, static memory 706, and/or within the processor 702 during execution thereof by the computer system 700, with the main memory 704 and the processor 702 also constituting machine-readable media.

Consistent with some embodiments, the instructions 724 may relate to the operations of an operating system. Depending on the particular type of the computer system 700, the operating system may, for example, be the iOS® operating system, the Android® operating system, a BlackBerry® operating system, the Microsoft® Windows® Phone operating system, Symbian® OS, or webOS®. Further, the instructions 724 may relate to operations performed by applications (commonly known as "apps"), consistent with some embodiments. One example of such an application is a mobile browser application that displays content, such as a web page or a user interface using a browser.

While the machine-readable medium 722 is shown in an example embodiment to be a single medium, the term "machine-readable medium" may include a single medium or multiple media (e.g., a centralized or distributed database, and/or associated caches and servers) that store the one or more data structures or instructions 724. The term "machine-readable medium" shall also be taken to include any tangible medium that is capable of storing, encoding, or carrying instructions (e.g., instructions 724) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instrucfions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

What is claimed is:

1. A system comprising:
one or more processors and executable instructions accessible on a non-transitory computer-readable medium that, when executed, cause the one or more processors to perform operations comprising:
identifying a social network profile, including social data, from which a social network entry originated, the social network entry including a reference to content hosted by a network-based content publisher;
matching the social network profile with a user record maintained by the networked-based content publisher based on a user identifier embedded in the reference to the content that is included in the social network entry, the user identifier corresponding to the user record; and
based on the matching of the social network profile with the user record, utilizing the social data of the social network profile to provide personalization services to a user associated with the user record.

2. The system of claim 1, wherein the reference is a uniform resource locator (URL).

3. The system of claim 1, wherein the user record corresponds to a user account hosted by the networked-based content publisher.

4. The system of claim 1, wherein the matching of the social network profile with the user record comprises detecting the user identifier embedded in the reference to the content hosted by the networked-based content publisher.

5. The system of claim 1, wherein the matching of the social network profile with the user record comprises:
determining a posting time corresponding to a publishing of the social network entry;
determining the posting time is within a predefined range of a generation time corresponding to a generation of a uniform resource locator (URL); and
determining the user record corresponds to a requestor of the generation of the URL at the generation time.

6. The system of claim 1, wherein the matching of the social network profile with the user record comprises:
determining a posting time corresponding to a publishing of the social network entry;
accessing an access log of the content publisher, the access log including a plurality of entries, each entry corresponding to an access of the content and specifying an access time;
comparing the posting time to the access log to identify a first access time within a predefined time of the posting time; and
determining the first access time corresponds to an access of the content by the user record.

7. The system of claim 6, wherein each entry of the access log further comprises a globally unique identifier (GUID).

8. The system of claim 7, wherein the determining the first access time corresponds to the access of the content by the user record comprises identifying a GUID corresponding to the user record from an entry of the access log corresponding to the first access time.

9. A method comprising:
identifying, using one or more processors, a social network profile, including social data, from which a social network entry originated, the social network entry including a reference to content hosted by a network-based content publisher;
matching the social network profile with a user record hosted by the networked-based content publisher based on a user identifier embedded in the reference to the content that is included in the social network entry, the user identifier corresponding to the user record; and
based on the matching of the social network profile with the user record, utilizing the social data of the social network profile to provide personalization services to the user record.

10. The method of claim 9, wherein the reference is a uniform resource locator (URL).

11. The method of claim 9, wherein the user record corresponds to a user account hosted by the networked-based content publisher.

12. The method of claim 9, wherein the matching of the social network profile with the user record comprises detecting the user identifier embedded in the reference to the content hosted by the networked-based content publisher.

13. The method of claim 9, wherein the matching of the social network profile with the user record comprises:
determining a posting time corresponding to a publishing of the social network entry;
determining the posting time is within a predefined range of a generation time corresponding to a generation of uniform resource locator (URL); and
determining the user record corresponds to a requestor of the generation of the URL at the generation time.

14. The method of claim 10, wherein the matching of the social network profile with the user record comprises:
determining a posting time corresponding to a publishing of the social network entry;
accessing an access log of the content publisher, the access log including a plurality of entries, each entry corresponding to an access of the content and specifying an access time;
comparing the posting time to the access log to identify a first access time within a predefined time of the posting time; and
determining the first access time corresponds to an access of the content by the user record.

15. The method of claim 14, wherein each entry of the access log further comprises a globally unique identifier (GUID).

16. The method of claim 15, wherein the determining the first access time corresponds to the access of the content by the user record comprises identifying a GUID corresponding to the user record from an entry of the access log corresponding to the first access time.

17. A non-transitory machine-readable medium having stored therein a set of program instructions which, when executed by one or more processors of a machine, cause the machine to perform operations comprising:
identifying a social network profile, including social data, from which a social network entry originated, the social network entry including a reference to content hosted by a network-based content publisher;
matching the social network profile with a user record maintained by the networked-based content publisher based on a user identifier embedded in the reference that is included in the social network entry, the user identifier corresponding to the user record; and
based on the matching of the social network profile with the user record, utilizing the social data of the social network profile to provide personalization services to the user record.

18. The non-transitory machine-readable medium of claim 17, wherein the reference is a uniform resource locator (URL).

19. The non-transitory machine-readable medium of claim 17, wherein the user identifier corresponds to a user account hosted by the networked-based content publisher.

* * * * *